United States Patent
Rupp

(10) Patent No.: US 9,441,871 B2
(45) Date of Patent: Sep. 13, 2016

(54) SHAPING DEVICE FOR A SHAVED ICE OR SNOW CONE PRODUCT

(71) Applicant: Snowie LLC, Salt Lake City, UT (US)

(72) Inventor: Carl A. Rupp, Salt Lake City, UT (US)

(73) Assignee: Snowie LLC, Salt Lake City, UT (US)

( * ) Notice: Subject to any disclaimer, the term of this patent is extended or adjusted under 35 U.S.C. 154(b) by 449 days.

(21) Appl. No.: 13/917,565

(22) Filed: Jun. 13, 2013

(65) Prior Publication Data

US 2014/0370141 A1    Dec. 18, 2014

(51) Int. Cl.
*F25C 5/12* (2006.01)
*A23G 9/04* (2006.01)

(52) U.S. Cl.
CPC ................ *F25C 5/12* (2013.01); *A23G 9/045* (2013.01)

(58) Field of Classification Search
CPC .................................. A23G 9/045; F25C 5/12
USPC ......................................................... 425/449
See application file for complete search history.

(56) References Cited

U.S. PATENT DOCUMENTS 4,655,403 A * 4/1987 Sciortino ............... F25C 5/12
241/278.1

FOREIGN PATENT DOCUMENTS

JP        2007155272 A *  6/2007

OTHER PUBLICATIONS

JPO machine translation of JP 2007-155272, retrieved Jan. 6, 2016, pp. 1-13.*

* cited by examiner

*Primary Examiner* — Timothy Kennedy
(74) *Attorney, Agent, or Firm* — Terrence J. Edwards; TechLaw Ventures, PLLC

(57) ABSTRACT

The disclosure extends to methods, systems, and devices for producing a shaved ice or snow cone product. The system may comprise an ice shaving or snow cone machine, a shaping device, and a blade for producing a shaved ice or snow cone product.

20 Claims, 11 Drawing Sheets

SHAPING DEVICE FOR A SHAVED ICE OR SNOW CONE PRODUCT

BACKGROUND

This disclosure relates generally to machines for preparing shaved ice or snow cone confectioneries, and more particularly, but not necessarily entirely, to a shaved ice or snow cone shaping device and an attachment mechanism for use with machines that prepare shaved ice or snow cone confectionaries.

A variety of machines have been developed, described and are widely known for creating or processing cold deserts and confectioneries by processing ice into more appealing eatable forms, such as snow cones and shaved ice. Such devices produce either ice granules (snow cones) or light, fluffy, finely textured shaved ice for subsequent flavoring using syrups.

Despite the advantages of shaved ice or snow cone machines that are available in the marketplace, improvements are still being sought. Machines in the marketplace may have a spout assembly comprising a channel that leads to a spout for expelling shaved ice or snow cone from the machine to a cup or other container for consumption by a user. Such spout assemblies, or spouts that expel shaved ice or snow cone, are often made from a hard plastic or other rigid material, such that adaptation to different shapes and sizes of cups is often difficult. For example, different cup styles and types, each having their own benefit to a consumer, are becoming increasingly popular. To effectively fill these different cup sizes and styles with shaved ice a different size spout may often be required to increase the efficiency (e.g., speed) of filling a cup with shaved ice or ice granules (snow cones).

In addition, because shaved ice or snow cone machines have an associated cost for each unit it is often expensive to provide multiple machines at one location. Even if multiple machines are financially feasible, changing from one machine to another tends to cause slowness to the overall shaved ice or snow cone operation, which may be disadvantageous in industries (such as shaved ice) where speed is required to keep a consumer line moving. For example, moving between machines or changing out machines may require large amounts of human capital to operate, thereby reducing the efficiency of a business.

In some instances an operator may use a sanitary glove to shape a shaved ice or snow cone product. The operator may be required to remove or change the sanitary glove after handling money or otherwise exposing the glove to an unsanitary surface. That glove change or removal process may slow down the efficiency of the business.

In various industries, for example a shaved ice or snow cone business or any other business in the concessions industry, it is important for the success of that business to move customers through a waiting line as quickly as possible to finalize the sale of a confectionary product to customers. In the example of a shaved ice or snow cone business, the ability to quickly modify the spout to fill different sizes and types of cups on the fly at the job site is imperative to the success of a shaved ice or snow cone concession stand, especially in locations where time is of the essence, for example at a halftime break at a sporting event or other intermission. Otherwise, when moving between machines or modifying the spout of the machine consumes too much time the business will lose out on the opportunity to make a sale. This is because the break or intermission is either over or the customers are tired of waiting in long lines and will seek other concessions.

As disclosed herein below, the disclosure provides an apparatus, system and method for attaching a device or an assembly to a spout or other part of the shaved ice or snow cone machine in an efficient, effective and elegant manner.

What is needed is an apparatus, system and methods that are efficient at being attached and detached to a spout or other part of the shaved ice or snow cone machine in an efficient, effective and elegant manner that will allow a user to fill various size and shapes of cups or containers. As will be seen, the disclosure provides such an apparatus, system and method.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims. Any discussion of documents, acts, materials, devices, articles or the like which has been included in the present specification is not to be taken as an admission that any or all of these matters form part of the prior art base, or were common general knowledge in the field relevant to the disclosure as it existed before the priority date of each claim of this application.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
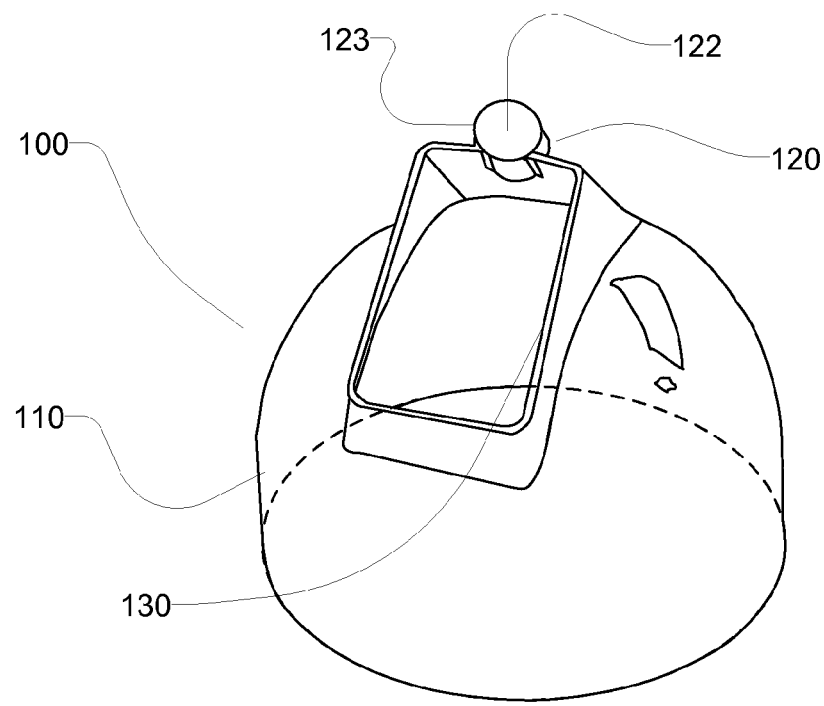
FIG. 1 illustrates a perspective view of an implementation of a shaping device for producing a shaved ice or snow cone product in accordance with the teachings and principles of the disclosure.

The disclosure extends to methods, systems, and devices for producing a shaved ice or snow cone product. In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

Before the methods, systems and devices for producing a shaved ice or snow cone product are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the terms "shaved ice" and/or "snow cone" refer broadly to the large family of ice-based desserts or confections made from the fine shavings of ice or finely crushed ice. It will be appreciated that shaved ice and/or snow cones may often include a flavoring that may be a syrup or other sweetened condiment that is added to the shaved ice or snow cone. Similarly, the terms "ice shaving" or "snow cone" in reference to a machine are intended broadly to include all machines used to make or produce the large family of ice-based desserts or confections that may be classified as shaved ice or snow cone products.

Referring now to the figures, where a shaping device and system for producing a shaved ice or snow cone product are illustrated. An implementation of a system for producing a shaved ice or snow cone product may comprise an ice shaving or snow cone machine, including all of its component parts, a shaping device, and a blade for producing a shaved ice or snow cone product.

Figure 2:
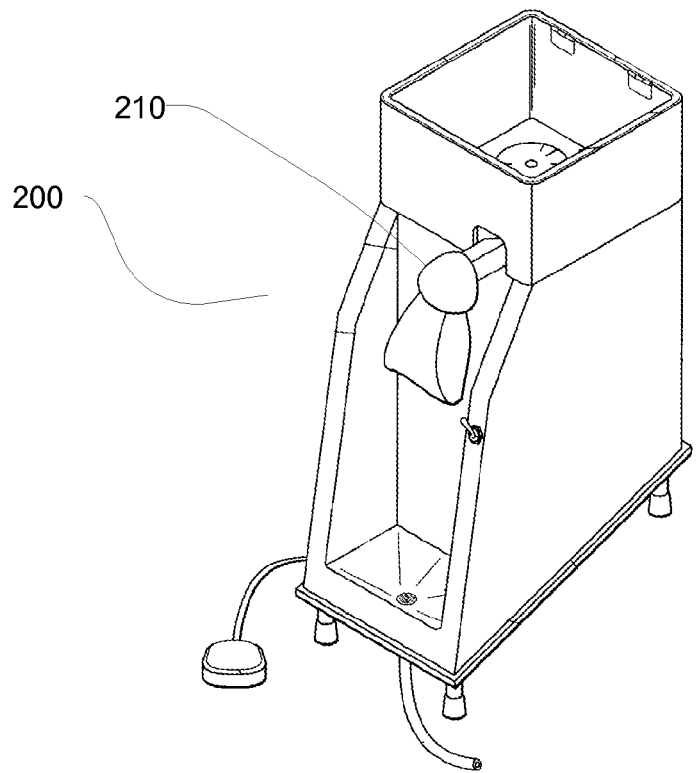
FIG. 2 illustrates a perspective view of an implementation of a shaved ice or snow cone machine for producing a shaved ice or snow cone product in accordance with the teachings and principles of the disclosure.
Figure 3:
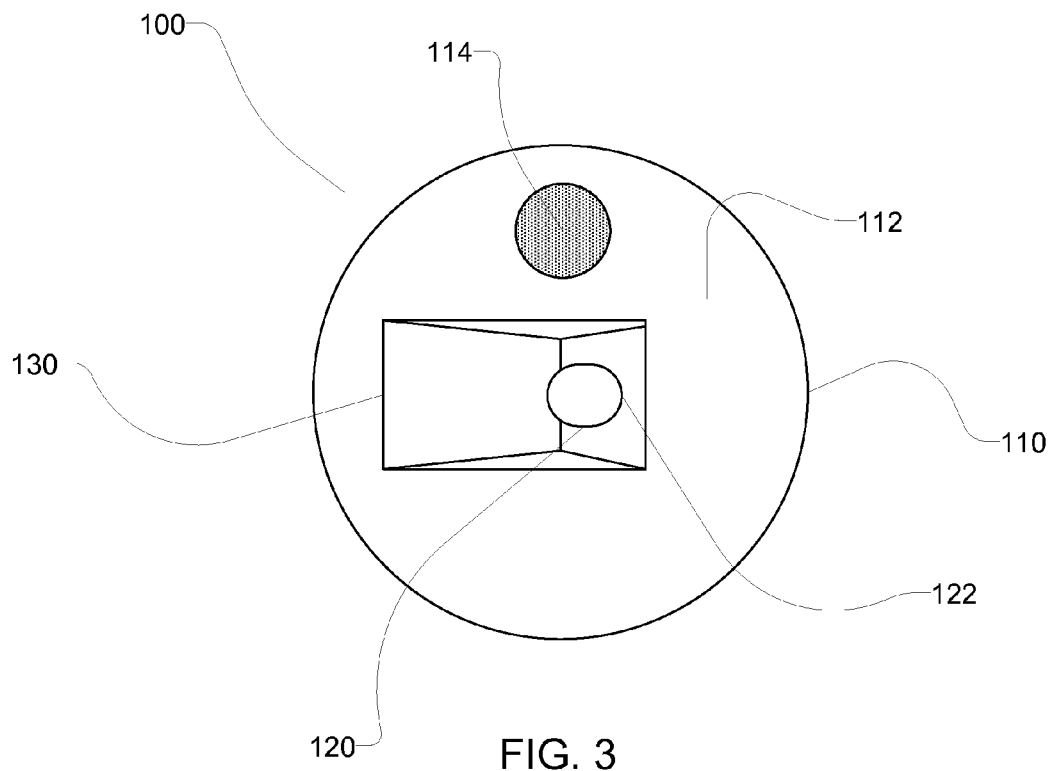
FIG. 3 illustrates a bottom view of an implementation of a shaping device for producing a shaved ice or snow cone product in accordance with the teachings and principles of the disclosure.
Figure 4:
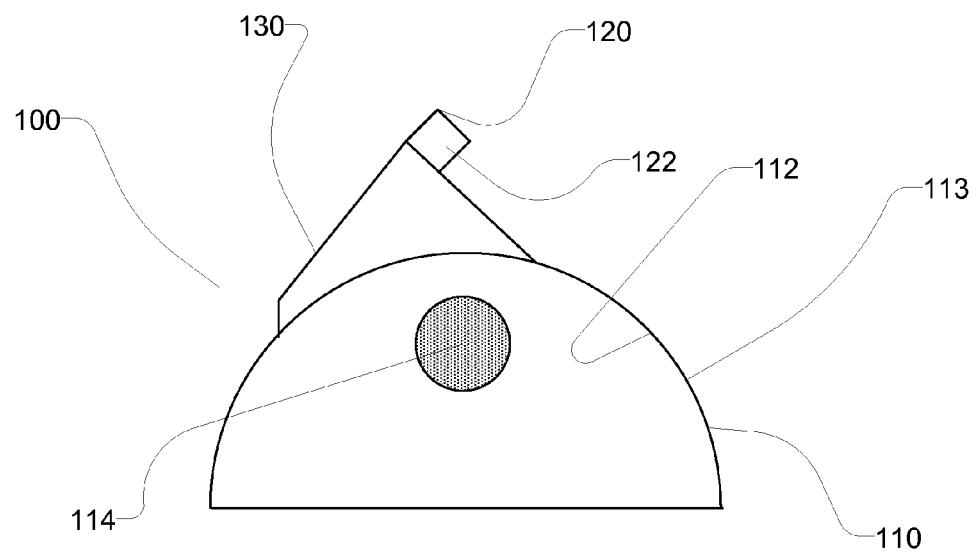
FIG. 4 illustrates a side view of an implementation of a shaping device for producing a shaved ice or snow cone product in accordance with the teachings and principles of the disclosure.
Figure 5:
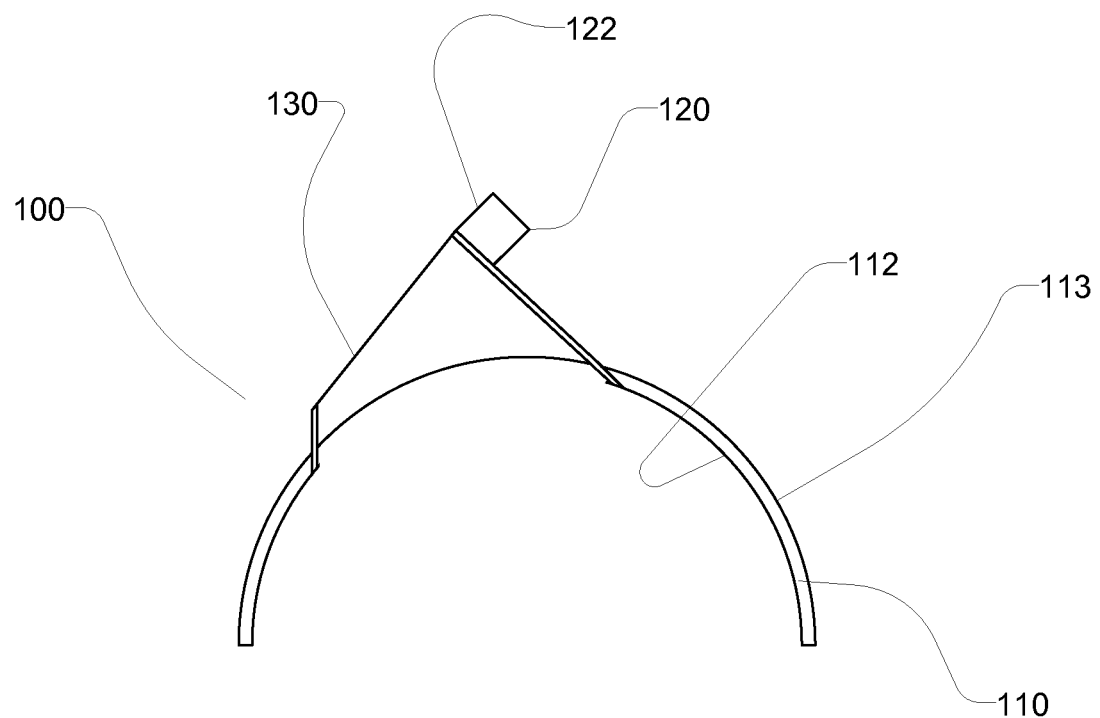
FIG. 5 illustrates a side, cross-sectional view of an implementation of a shaping device for producing a shaved ice or snow cone product in accordance with the teachings and principles of the disclosure.
Figure 6:
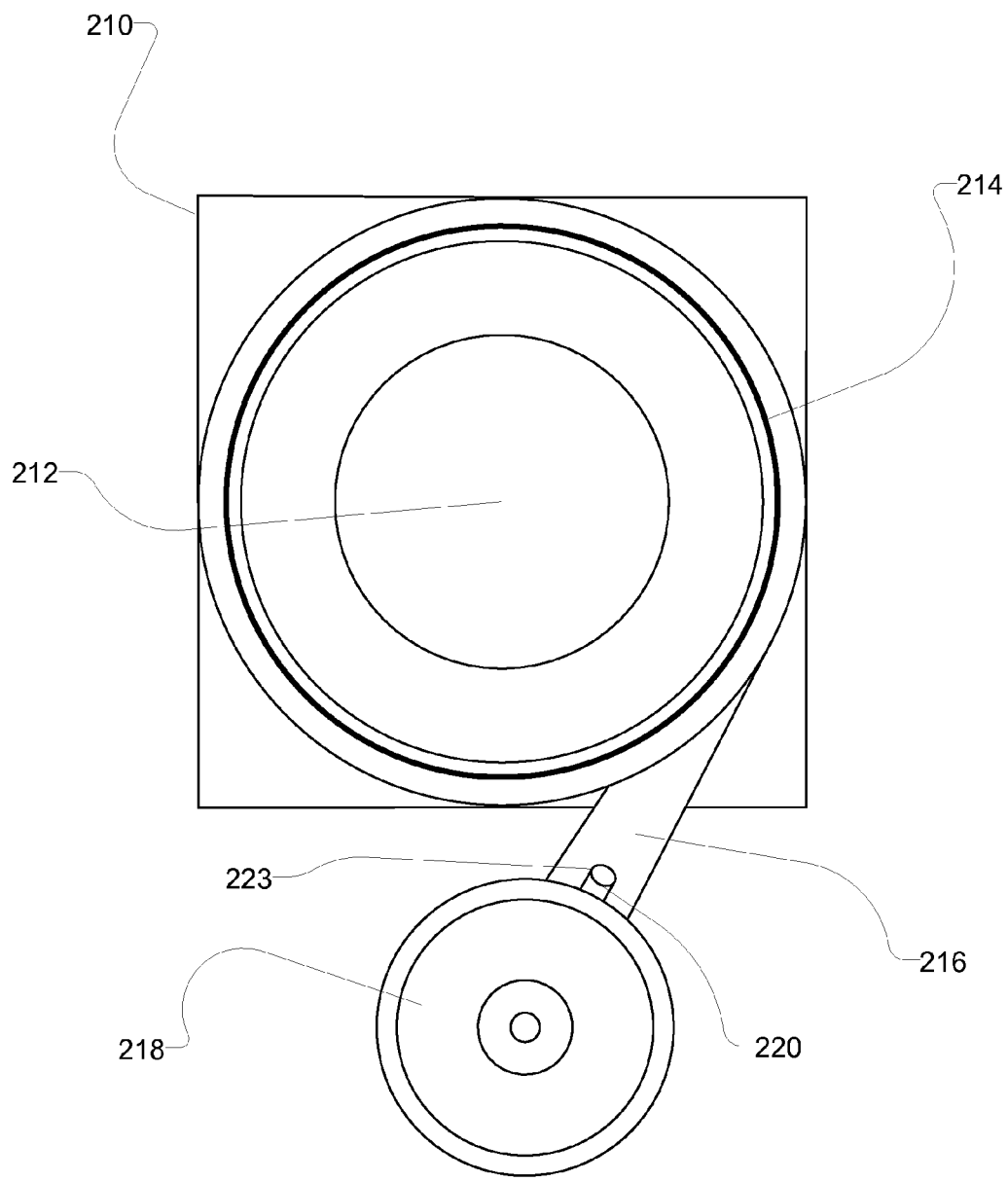
FIG. 6 illustrates a top view of an implementation of a system for producing a shaved ice or snow cone product in accordance with the teachings and principles of the disclosure.
Figure 7:
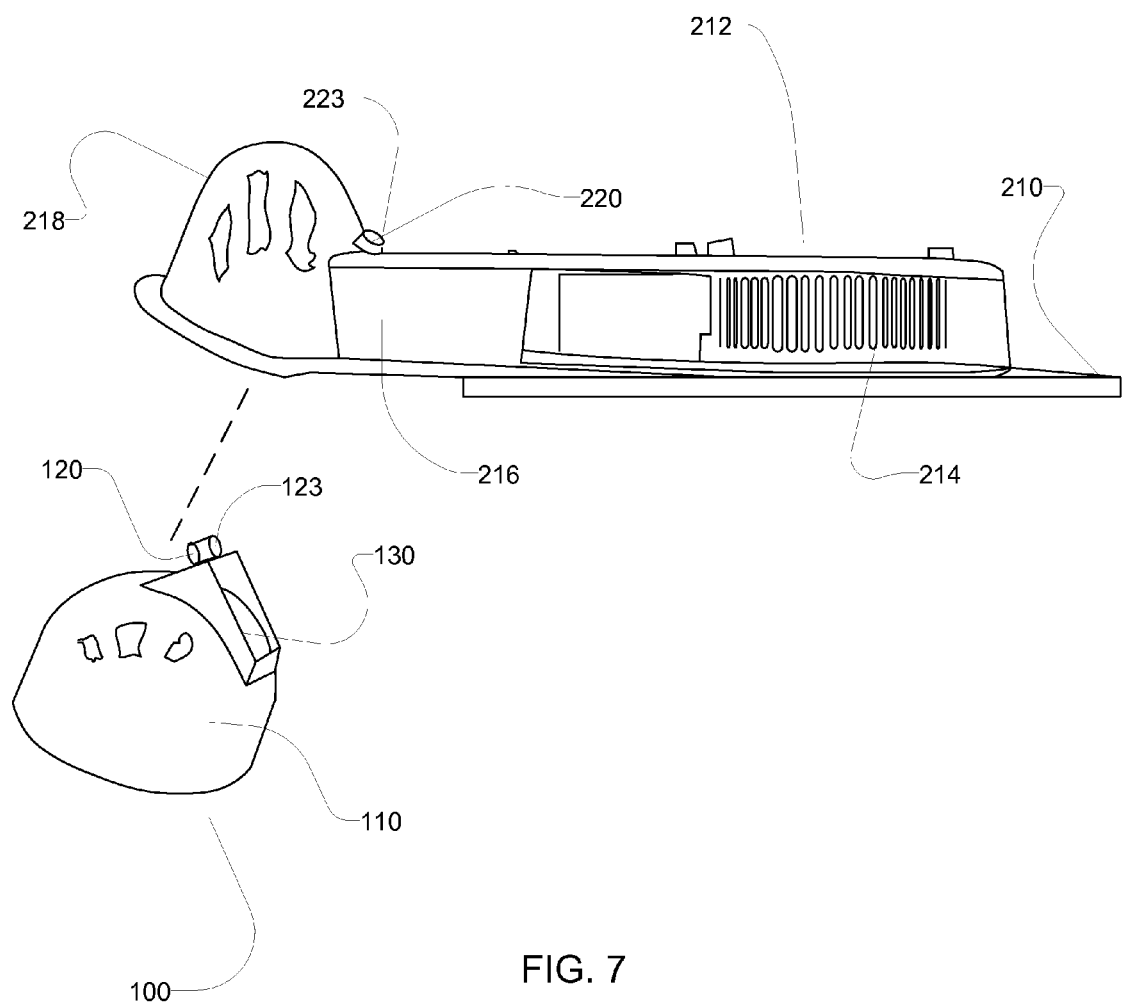
FIG. 7 illustrates a side view of an implementation of a system for producing a shaved ice or snow cone product in accordance with the teachings and principles of the disclosure.
Figure 8:
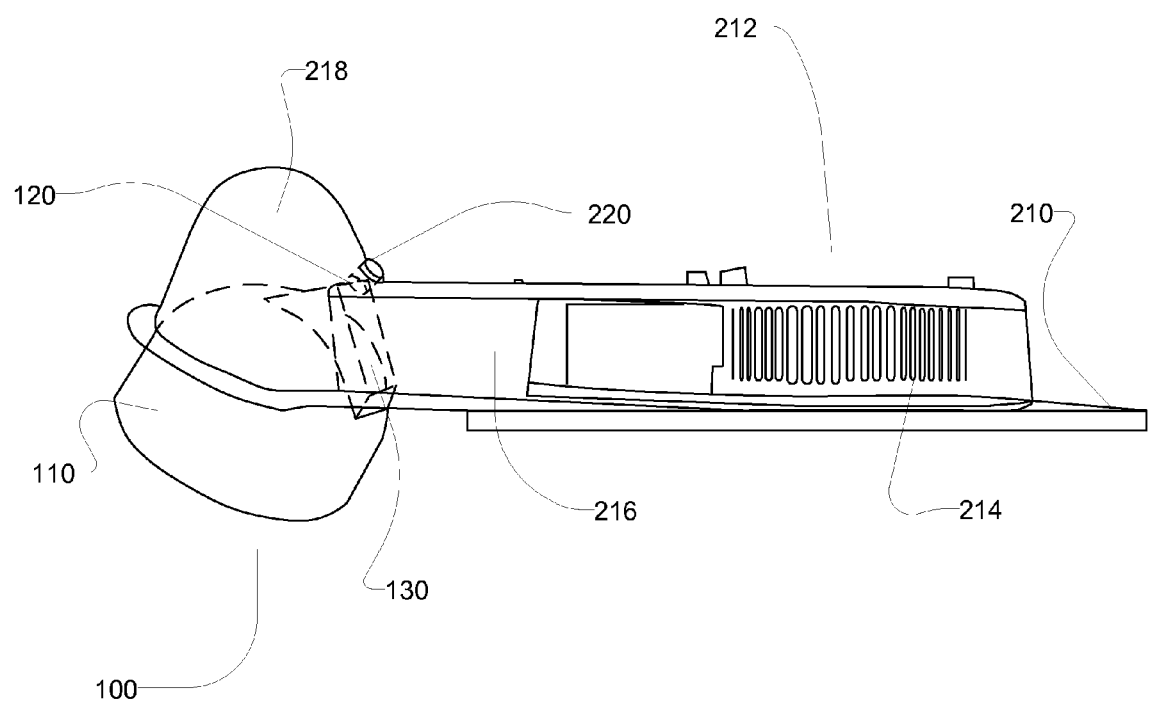
FIGS. 8, 8A, and 8B illustrate side views of various implementations of a system for producing a shaved ice or snow cone product with a shaping device attached to a spout or spout assembly in accordance with the teachings and principles of the disclosure.
Figure 8A:
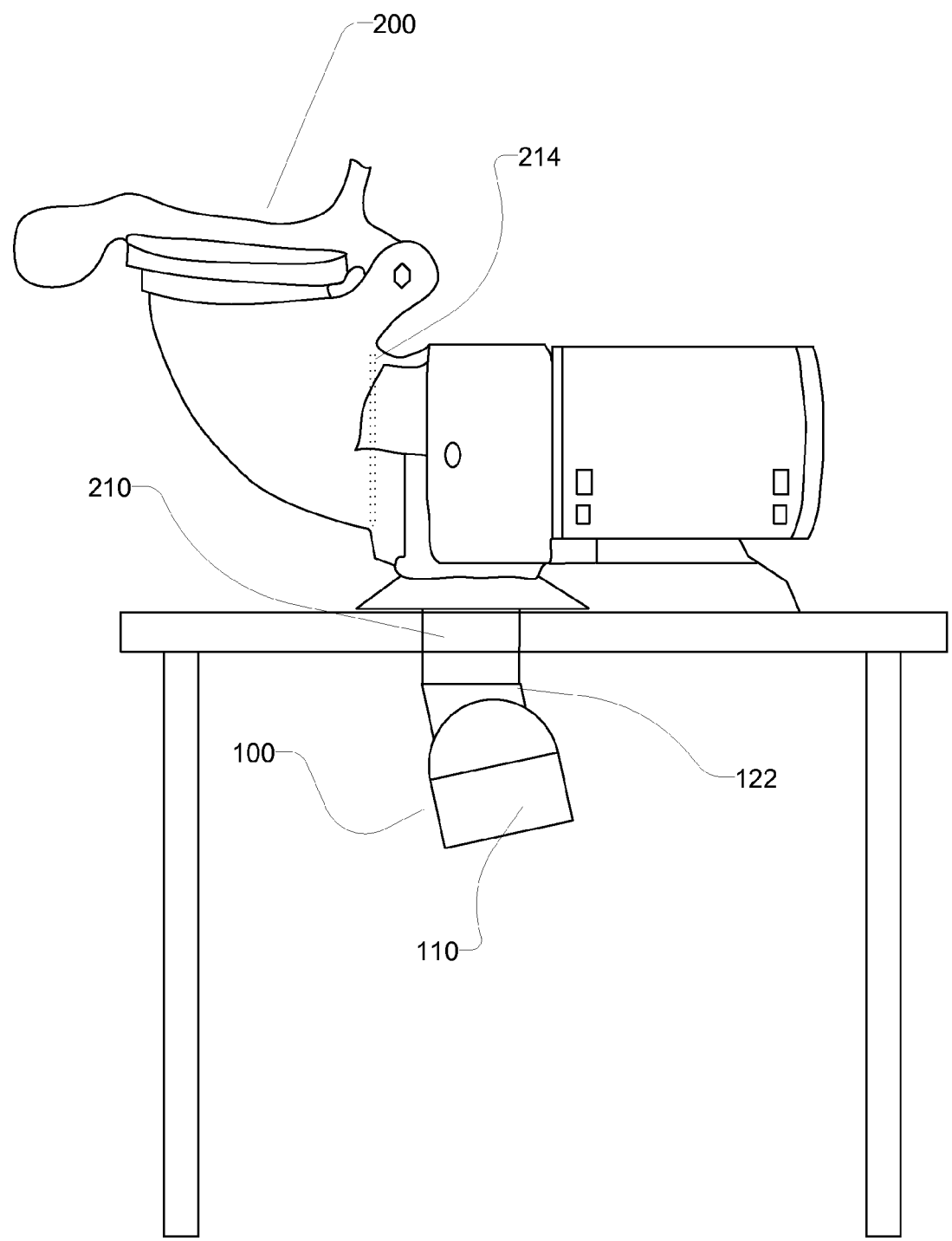
Figure 8B:
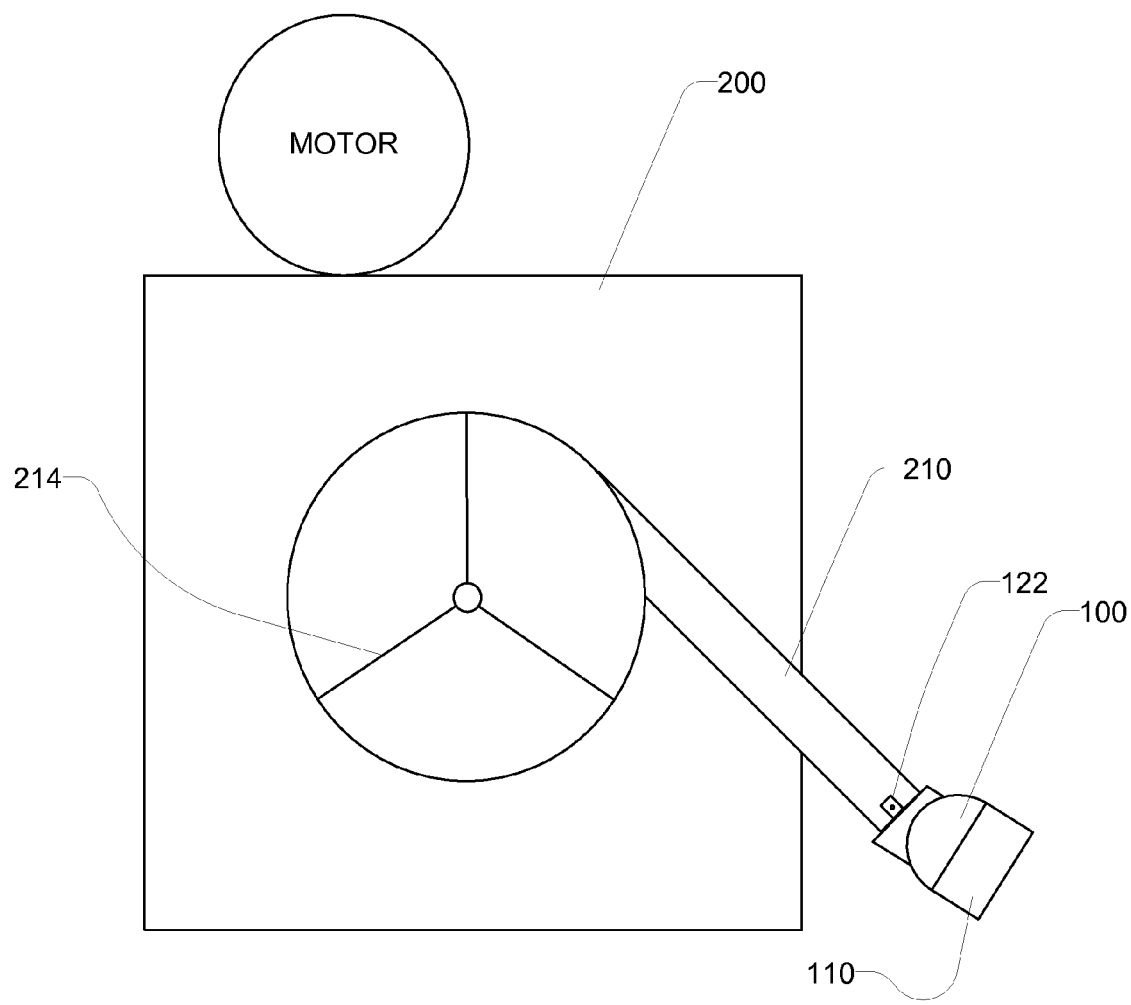

Referring now to FIGS. 1-2, FIG. 1 illustrates a perspective view of an implementation of a shaping device for producing a shaved ice or snow cone product in accordance with the teachings and principles of the disclosure. The shaping device 100 may be used in conjunction with an ice shaving or snow cone machine 200 (illustrated best in FIGS. 2, 8A and 8B) for producing a shaved ice or snow cone product. Due to the various shapes and sizes of containers, particularly those with open mouths or large-mouth openings, that may be used to contain a shaved ice or snow cone product, there are times when providing a shaping device 100 may be advantageous for efficiently filling such containers not only due to ease of use, but also in time savings for filling such containers. Further, the use of the shaping device 100 in conjunction with various machines for producing a shaved ice or snow cone product may also eliminate the need for a user to utilize his or her hands (whether gloved or otherwise) to shape the shaved ice or snow cone product, thereby making the product more sanitary. The shaping device 100 may comprise a body 110 that may be sized and shaped to produce the shaved ice or snow cone product. It will be appreciated that the shaved ice or snow cone product may correspond in shape with the shape of the body 110 of the shaping device 100.

Referring now to FIGS. 1, 3-5, the body 110 of the shaping device 100 may comprise an inner surface 112 and an outer surface 113. The inner surface 112 of the body 110 may comprise a textured surface 114. The textured surface 114 may be used to produce a shaved ice or snow cone product having a corresponding textured surface.

The shaping device 100 may also comprise a mechanism 120 for attaching the shaping device 100 to the ice shaving or snow cone machine 200. The mechanism 120 may comprise a connector 122 that may be configured and dimensioned for communicating with a portion of the ice shaving or snow cone machine 200. The shaping device 100 may also comprise a chute 130 that may be configured and dimensioned for mechanically communicating with a spout or spout assembly 210 of the ice shaving or snow cone machine 200. The chute 130 may be in mechanical communication with the body 110, such that as ice is shaved via a blade 214 of the ice shaving or snow cone machine 200, the shaved ice or snow cone moves through the spout assembly 210 of the ice shaving or snow cone machine 200, into the chute 130 and into a user's cup or container for carrying or consumption. The chute 130 may comprise a wall or a plurality of walls that may be sized and shaped to matingly engage and mechanically communicate with a corresponding channel or passageway of the spout or the spout assembly 210, such that when shaved ice or snow cone is expelled it may be expelled from the spout or spout assembly 210 through the chute 130 and into the container or cup. It will be appreciate that the body 110 of the shaping device 100 may ultimately be used to form the shape of the shaved ice or snow cone product as noted above.

Referring now to the various mechanisms 120 for attaching the shaping device 100 to the ice shaving or snow cone machine 200, it will be appreciated that in one implementation, the connector 122 of the shaping device 100 may be a magnet. In an implementation, the magnet (connector 122) may be in magnetic communication with any metallic portion of the ice shaving or snow cone machine 200. In such an implementation, the connector 122 does not necessarily have to be in mechanical communication with the spout or spout assembly 210. Instead, a cup or container may be placed beneath the spout or spout assembly 210 and subsequently matched with the shaping device 100. However, it will be understood that it may be advantageous to locate the shaping device 100 in close proximity to the spout or spout assembly 210.

Referring now to FIGS. 6-8B, there is illustrated a spout assembly 210 of the ice shaving or snow cone machine 200. The spout assembly 210 may comprise a hopper 212 and a blade 214. Ice may enter into the hopper 212 area where the ice is then introduced to the blade 214. Once the ice is shaved by the blade 214, the ice may travel through a channel 216 before being expelled from the spout 218. The spout assembly 210 may further comprise a corresponding connector mechanism 220. In one implementation, the connector 122 of the shaping device 100 may be a first magnet 123 that may be in magnetic communication with the corresponding connector mechanism 220 of the spout assembly 210. In an implementation, the connector mechanism 220 may be a second magnet 223 that may be connected to the ice shaving or snow cone machine 200. In an implementation, the first magnet 123 may be attached to a portion of the chute 130 and the second magnet 223 may be attached to the spout assembly 210 of the ice shaving or snow cone machine 200, such that the first magnet 123 and the second magnet 223 together hold the shaping device 100 in location with respect to the spout assembly 210.

It will be appreciated that in an implementation the connector 122 of the shaping device 100 may be mechanically attachable to a portion of the ice shaving or snow cone machine 200. For example, the mechanical attachment of the connector 122 may include a lip that attaches to a corresponding flange, a bolted assembly, a hook and loop fastener, a screw, a latch, a threaded metal insert, and a press fit connection that attaches the shaping device 100 to a portion of the ice shaving or snow cone machine 200. In an implementation, the connector 122 may be chosen from a group the group consisting of a lip that attaches to a corresponding flange, a bolted assembly, a hook and loop fastener, a screw, a latch, a threaded metal insert, and a press fit connection that attaches the shaping device 100 to a portion of the ice shaving or snow cone machine 200.

It will be appreciated that the shaping device 100 and the spout assembly 210 may be manufactured from a polymeric material, including the spout 218.

Figure 9:
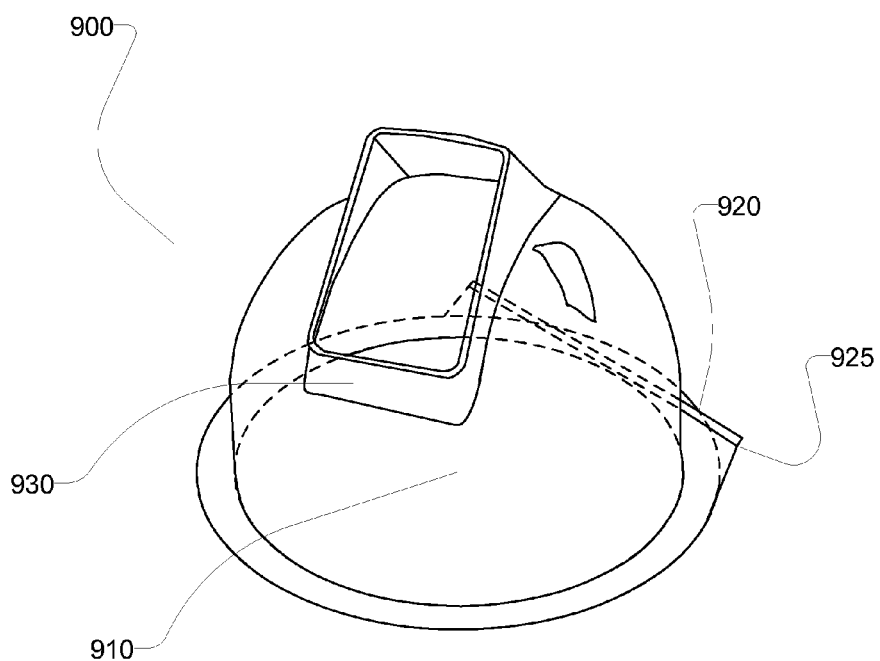
FIGS. 9-11 illustrate alternative implementations of a shaping device for producing a shaved ice or snow cone product in accordance with the teachings and principles of the disclosure.
Figure 10:
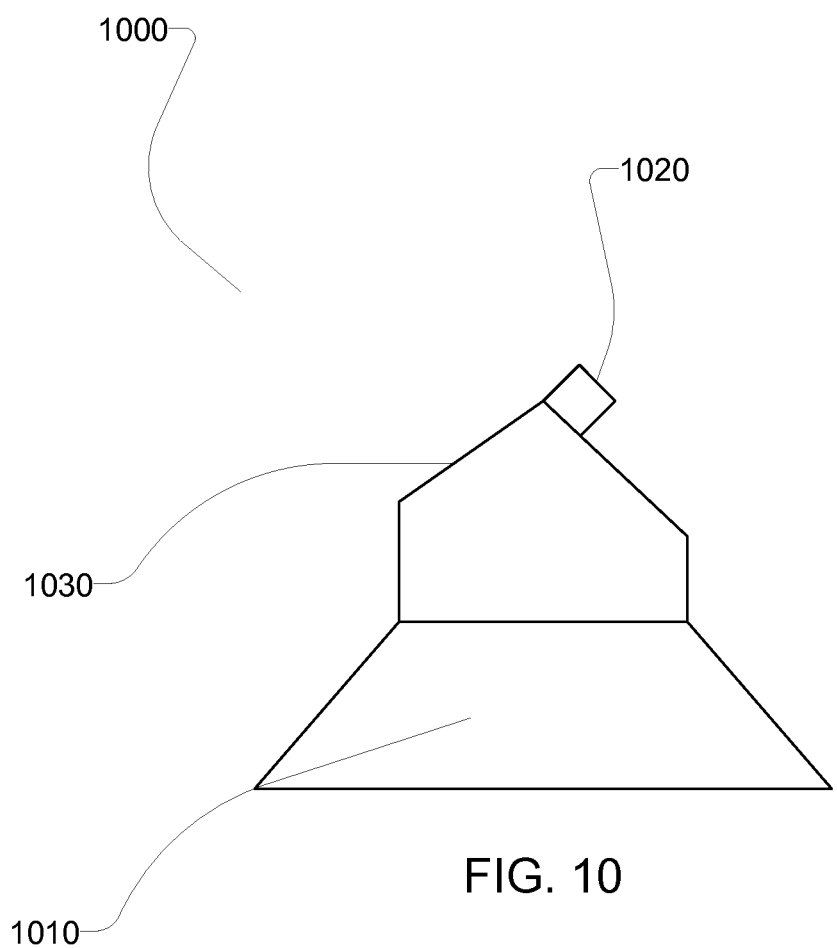
Figure 11:
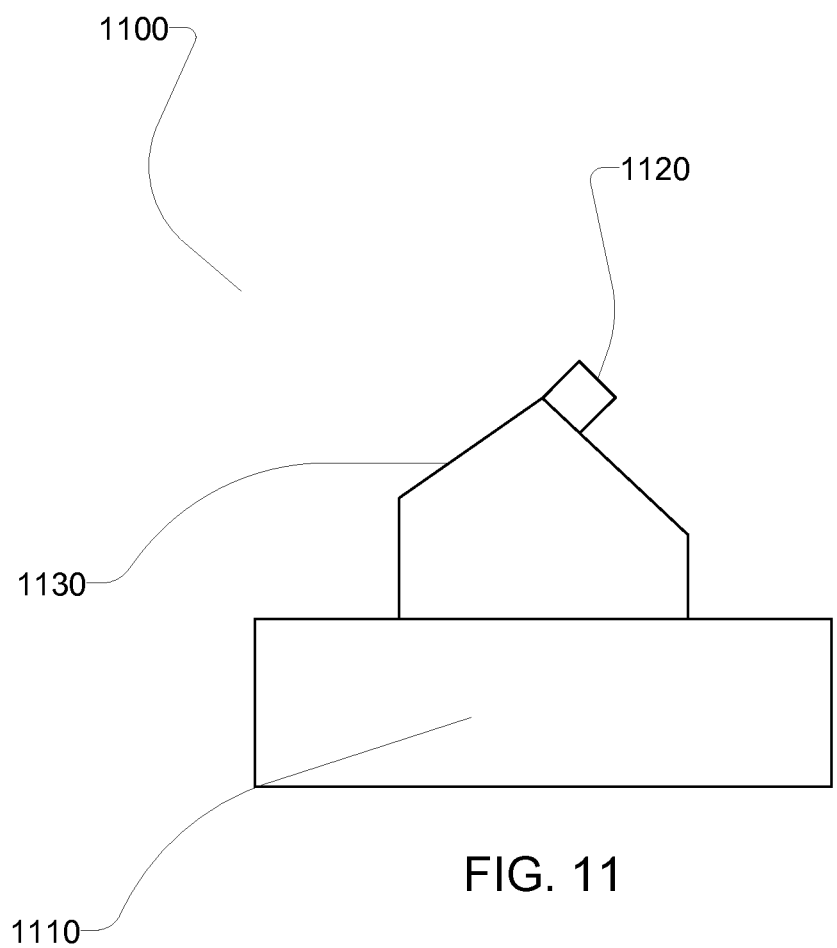

FIGS. 9-11 illustrate alternative implementations of a shaping device for producing a shaved ice or snow cone product in accordance with the teachings and principles of the disclosure.

FIG. 9 illustrates a shaping device 900 that comprises the same features, including the chute, as the shaping device 100 illustrated in FIGS. 1, 3-8, with the exception of the attachment mechanism and connector. The shaping device 900 may comprise an attachment mechanism 920 having a connector 922. The connector 922 may be a lip 925 that attaches to a corresponding flange 230 on the spout 218 of the spout assembly 200.

FIGS. 10-11 illustrate alternative implementations of body shapes that may be utilized by the disclosure. It will be appreciated that the body 110, 1010, 1110 of the shaping device 100, 1000, 1100 may be any shape, including but not limited to circular shapes, oval shapes, triangular shapes, rectangular shapes, square shapes, pentagonal shapes, hexagonal shapes, octagonal shapes and other shapes that may be used to shape a shaved ice or snow cone product. Other shapes that the body may include are star, crescent, and flower shapes. In one implementation, the body 110 may be domed shaped, such that the resulting shaved ice or snow cone product is correspondingly domed shaped. It will be appreciated that various shapes and sizes of shaping devices and bodies may be used without departing from the spirit or scope of the disclosure.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

In the foregoing Detailed Description, various features of the disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A shaping device for use in conjunction with an ice shaving machine for producing a shaved ice product comprising:
    a body having an inner surface that is sized and shaped to produce the shaved ice product having a predetermined shape, such that the configuration of the inner surface of the body determines a corresponding size and shape of the shaved ice product;
    a mechanism for detachably attaching the shaping device to the ice shaving machine at a spout of the ice shaving machine comprising a connector that is configured and dimensioned for communicating with a portion of said ice shaving machine; and
    a chute that is configured to correspond with the spout of the ice shaving machine thereby allowing shaved ice to pass into the body, wherein the chute comprises a wall that extends outwardly from the body and matingly engages and mechanically communicates with a corresponding channel of the spout of the ice shaving machine.

2. The shaping device of claim 1, wherein the connector is a magnet that is in magnetic communication with a metallic portion of the ice shaving machine.

3. The shaping device of claim 1, wherein the connector is a first magnet that is in magnetic communication with a second magnet that is connected to the ice shaving machine.

4. The shaping device of claim 3, wherein the first magnet is attached to the chute and the second magnet is attached to a spout assembly of the ice shaving machine, such that the first and second magnets together hold the shaping device in location with respect to the spout assembly.

5. The shaping device of claim 3, wherein the first magnet and the second magnet are configured so as to align the spout of the ice shaving machine with the chute of the shaping device.

6. The shaping device of claim 1, wherein the body is domed shaped, such that the resulting shaved ice product is correspondingly domed shaped.

7. The shaping device of claim 1, wherein the body comprises a textured inner surface, such that the resulting shaved ice product comprises a corresponding texture.

8. The shaping device of claim 1, wherein the shaving device is manufactured from a polymeric material.

9. The shaping device of claim 1, wherein the connector is mechanically attachable to a portion of an ice shaving machine.

10. The shaping device of claim 9, wherein the connector is chosen from a group of a lip that attaches to a corresponding flange, a bolted assembly, a hook and loop fastener, a screw, a latch, a threaded metal insert, and a press fit connection that attaches the shaping device to a portion of the ice shaving machine.

11. A system for producing a shaved ice product comprising:
    an ice shaving machine;
    a shaping device according to claim 1; and
    a blade for producing a shaved ice product;
    wherein the shaping device comprises:
        a body that is sized and shaped to produce the shaved ice product, wherein the shaved ice product corresponds in shape with the body; and
        a mechanism for attaching the shaping device to the ice shaving machine comprising a connector that is in magnetic communication with a portion of said ice shaving machine.

12. The system of claim 11, wherein the system further comprises a spout assembly that is in mechanical communication with the ice shaving machine, and wherein the shaping device further comprises a chute that is in mechanical communication with said spout assembly.

13. The system of claim 12, wherein the chute is in mechanical communication with the body, such that shaved ice moves through the spout assembly and into the chute to a user's container, and wherein the body forms the shape of the shaved ice product.

14. The system of claim 11, wherein the connector of the shaping device is a magnet that is in magnetic communication with a metallic portion of the ice shaving machine.

15. The system of claim 11, wherein the connector of the shaping device is a first magnet that is in magnetic communication with a second magnet that is in communication with the ice shaving machine.

16. The system of claim 15, wherein the spout assembly further comprises a domed portion located at and exit of the spout assembly, and wherein the first magnet is attached to the chute and the second magnet is attached to at least a part of the domed portion of the spout assembly, such that the first and second magnets in conjunction hold the shaping device in location with respect to the spout assembly.

17. The system of claim 11, wherein the body of the shaping device is domed shaped, such that the resulting shaved ice product is correspondingly domed shaped.

18. The system of claim 11, wherein the body comprises a textured inner surface such that the resulting shaved ice product comprises a corresponding texture.

19. The system of claim 11, wherein the ice shaving machine further comprises a spout assembly, wherein the shaving device and the spout assembly are manufactured from a polymeric material.

20. The system of claim 11, wherein the connector is mechanically attachable to a portion of the ice shaving machine, wherein the connector is chosen from a group of a lip that attaches to a corresponding flange, a bolted assembly, a hook and loop fastener, a screw, a latch, a threaded metal insert, and a press fit connection that attaches the shaping device to a portion of the ice shaving machine.

* * * * *